United States Patent Office 3,236,482
Patented Feb. 22, 1966

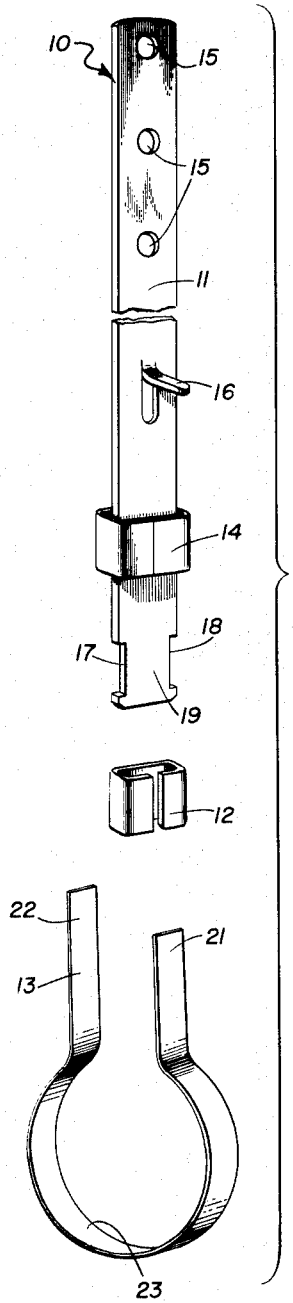
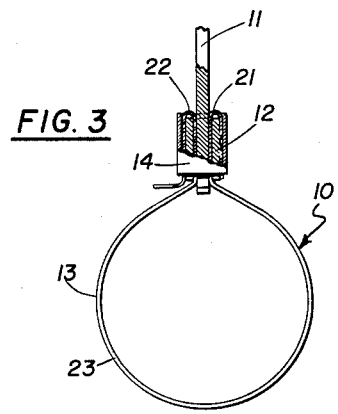
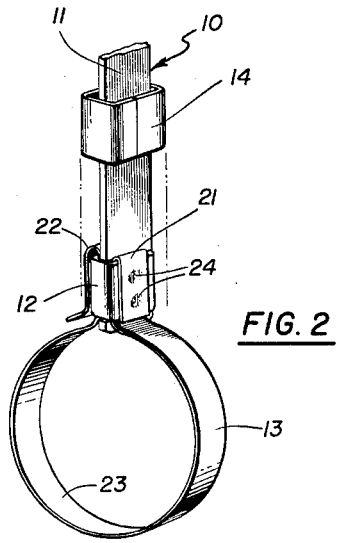
FIG. 1
FIG. 3
FIG. 2
CHARLES R. FITZGERALD
INVENTOR.

3,236,482
PIPE HANGER
Charles R. Fitzgerald, 12 Sun Valley Drive,
Worcester, Mass.
Filed Jan. 6, 1965, Ser. No. 423,743
7 Claims. (Cl. 248—62)

This invention relates to a pipe hanger and, more particularly, to apparatus arranged to suspend conduits of various kinds in buildings and other structures.

In the installation of plumbing and, particularly, in running horizontal pipes in the cellar of a residence, it is necessary to provide a support for that pipe, which support must have a number of attributes. First of all, the pipe hanger should be capable of permitting expansion and contraction of the pipe throughout its length; this is particularly true in a heating installation where temperature changes may be extreme. Furthermore, the pipe hanger should be capable of adjustment not only relative to the building structure but also in the size of the portion which embraces the pipe. Many pipe hangers of this type have been supplied in the past, but considerable difficulties have been experienced in adjusting them to take care of various sized pipes; those pipe hangers which provide for adjustment have been extremely complicated and, therefore, expensive. These and other difficulties experienced with the prior art devices have been obviated in a novel manner by the present invention.

It is, therefore, an outstanding object of the invention to provide a pipe hanger which is readily adjustable for use with various size diameters of pipe.

Another object of this invention is the provision of a pipe hanger which is adjustable without the use of special tools.

A further object of the present invention is the provision of a pipe hanger which is simple and rugged in construction, which is inexpensive to manufacture, and which is capable of a long life of useful service with a minimum of maintenance.

It is another object of the instant invention to provide a pipe hanger which, after many years of use, is still capable of being readjusted for reuse with different size pipes.

It is a further object of the invention to provide a pipe hanger which is so constructed as to make use almost entirely of sheet metal stampings.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is a perspective exploded view of a pipe hanger embodying the principles of the present invention;

FIG. 2 is a perspective view of a portion of the hanger showing the method of assembly, and FIG. 3 is an elevational view of an assembled pipe hanger with a portion broken away to show the construction more clearly.

Referring first to FIG. 1, which best shows the general features of the invention, the pipe hanger, indicated generally by the reference numeral 10, is shown as consisting of a main support element 11, an inner collar 12, a strap 13, and an outer collar 14.

The main support element 13 is an elongated rectangular sheet metal member provided with apertures 15 at its upper end by which it may be selectively nailed to a joist of a house or other supporting structure. In its intermediate position it is provided with a punched-out peg 16 adapted to limit the sliding motion of the outer collar 14 upwardly. At the lower end, the main support element is provided with opposed notches 17 and 18 defining a reduced portion 19 of the support element. The inner collar 12 is formed from a single rectangular piece of sheet metal which is wrapped around the reduced portion 19 and lies in the notches 17 and 18.

The strap 13 is formed of a thin malleable sheet of metal which is capable of considerable amount of bending without breakage. The strap is provided with a straight end 21 and a straight end 22 and is bent in its intermediate portion to form an almost complete circular loop 23. As is evident in FIG. 2, the end 21 of the strap 13 is passed upwardly inside of the inner collar 12 and lies between that collar and the surface of the support element 11. It is then bent downwardly along the outside of the collar and is then welded to the collar by spot welds 24 so that it not only is itself locked in place relative to the collar 12 but it also serves to lock the collar in such a position that its ends remain fixed relative to one another so that it cannot expand. There is sufficient room, however, between the other side of the collar 12 and the other surface of the main support element; through this space extends the end 22 of the strap. This end is pulled up through the inner collar 12 until the loop 23 is of the desired size and then it is bent downwardly against the outer surface of the inner collar 12. Then, the outer collar 14 is pushed downwardly over the inner collar and over the ends 21 and 22 of the strap which lie on the outer surface of the inner collar 12. It thus locks them in place since the outer collar is selected to be of such a size that it fits tightly over the ends of the strap.

The operation of the invention will now be readily understood in view of the above description. In supporting a pipe, the main suport element 11 is nailed to a vertical surface presumably the side of a joist in a house) so that it hangs in a vertical direction with the end carrying the reduced portion 19 extending downwardly. The pipe is passed through the loop 23 and the end 22 is drawn upwardly between the inner collar 12 and the support element 11 until the loop fits tightly around the pipe. Then the end 22 is bent downwardly and the outer loop 14 is forced over the two ends of the loop so that the free end 22 is locked in place. As a practical matter, the device, when sold on the market, would be assembled in the manner shown in FIG. 2 with the loop 12 welded to the end 21 of the strap so that neither one of them are removable. The outer collar 14 is slidable along the main support element 11 but cannot be removed from either end since, at the lower end it is prevented from doing so by the presence of the inner collar 12 and the strap 13, while in the upward direction the peg 16 prevents removal. This means that the entire pipe hanger can be sold and shipped without danger of parts being lost. The flexible member from which the loop 23 is formed permits the pipe to move due to thermal expansion and contraction, particularly in a heating system. The flexible, malleable nature of this strap permits the pipe hanger to be removed to be adjusted for different sizes of pipe and to be re-used even many years after its initial installation and after it has been subjected to dust and water for a considerable period of time. The simplicity of the construction makes it inexpensive to manufacture and, therefore, very useful, since it gives all the benefits of more expensive pipe hangers without the cost thereof.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pipe hanger, comprising (a) a main support element,
(b) a collar mounted on the support element, and
(c) a flexible strap attached at one end to the collar and slidable at the other end through the collar to adjust the size of a pipe-embracing loop formed thereby.

2. A pipe hanger, comprising
(a) an elongated main support element adapted to depend vertically and having opposed notches extending inwardly from opposite sides adjacent the lower end,
(b) a sheet metal inner collar extending around the lower end of the support element and residing in the said notches,
(c) an elongated flexible metal strap forming a loop and having one end located between the collar and the support element and welded to the collar, the strap having its other end slidable between the collar and the support element to adjust the loop size and being bendable over the outer surface of the collar, and
(d) an outer collar slidable over the inner collar to lock the strap in place after the size of the loop has been adjusted.

3. A pipe hanger as recited in claim 2, wherein the strap is formed of malleable metal so that repeated bending will not cause it to break.

4. A pipe hanger as recited in claim 2, wherein the support element is provided with an outwardly-extending peg so that the movement of the outer collar along the element is limited.

5. A pipe hanger as recited in claim 2, wherein the support element is provided with apertures spaced along its length to permit selective attachment by fasteners to a supporting structure.

6. A pipe hanger as recited in claim 2, wherein the inner collar is formed from a rectangular strip of metal bent into a loop with the ends adjacent one another, the welding of the strap to the collar also serving to maintain the ends of the collar in a fixed relationship.

7. A pipe hanger, comprising
(a) a main support element,
(b) a collar mounted on the support element,
(c) a flexible strap attached at one end to the collar and slidable at the other end through the collar to adjust the size of a pipe-embracing loop formed thereby, and
(d) an outer collar slidable over the inner collar to lock the strap in place after the size of the loop has been adjusted.

References Cited by the Examiner

UNITED STATES PATENTS 2,289,995   7/1942   Powers _____ 248—60

CLAUDE A. LE ROY, *Primary Examiner.*